United States Patent [19]

Downs

[11] Patent Number: 5,800,705
[45] Date of Patent: Sep. 1, 1998

[54] HEAT EXCHANGER FOR AERATION TANK

[75] Inventor: Ernest W. Downs, Cincinnati, Ohio

[73] Assignee: United States Filter Corporation, Palm Desert, Calif.

[21] Appl. No.: 908,331

[22] Filed: Aug. 7, 1997

[51] Int. Cl.[6] .................................. C02F 3/20; B01F 3/04
[52] U.S. Cl. .................. 210/177; 210/180; 210/220; 261/128; 261/157
[58] Field of Search ........................... 210/612, 177, 210/180, 766, 220; 261/128, 129, 157, 161

[56] References Cited

U.S. PATENT DOCUMENTS

| | | | |
|---|---|---|---|
| 2,071,509 | 2/1937 | Dudley | 261/11 |
| 3,031,174 | 4/1962 | Swanton | 261/138 |
| 3,976,456 | 8/1976 | Alcock | 261/161 |
| 4,207,180 | 6/1980 | Chang | 210/612 |
| 4,299,780 | 11/1981 | Sanderson et al. | 261/128 |
| 4,486,310 | 12/1984 | Thornton | 261/122.2 |
| 4,671,351 | 6/1987 | Rappe | 210/177 |
| 4,719,015 | 1/1988 | Urband | 210/180 |
| 5,183,563 | 2/1993 | Rodden | 210/180 |
| 5,190,670 | 3/1993 | Stearns | 210/180 |
| 5,330,688 | 7/1994 | Downs | 261/161 |
| 5,422,044 | 6/1995 | Cheng | 261/128 |

*Primary Examiner*—Thomas G. Wyse
*Attorney, Agent, or Firm*—William B. Noll

[57] ABSTRACT

The invention relates to a tube bank heat exchanger for use in reducing the temperature of air delivered under pressure to an air diffuser system within a wastewater treatment facility. The tube bank heat exchanger, submerged within the wastewater, is of a configuration which extends the air flow path from the air source to the diffuser system. By such configuration the temperature of the air delivered to the diffuser system is reduced to a temperature of no more than about 140 degrees F.

15 Claims, 8 Drawing Sheets

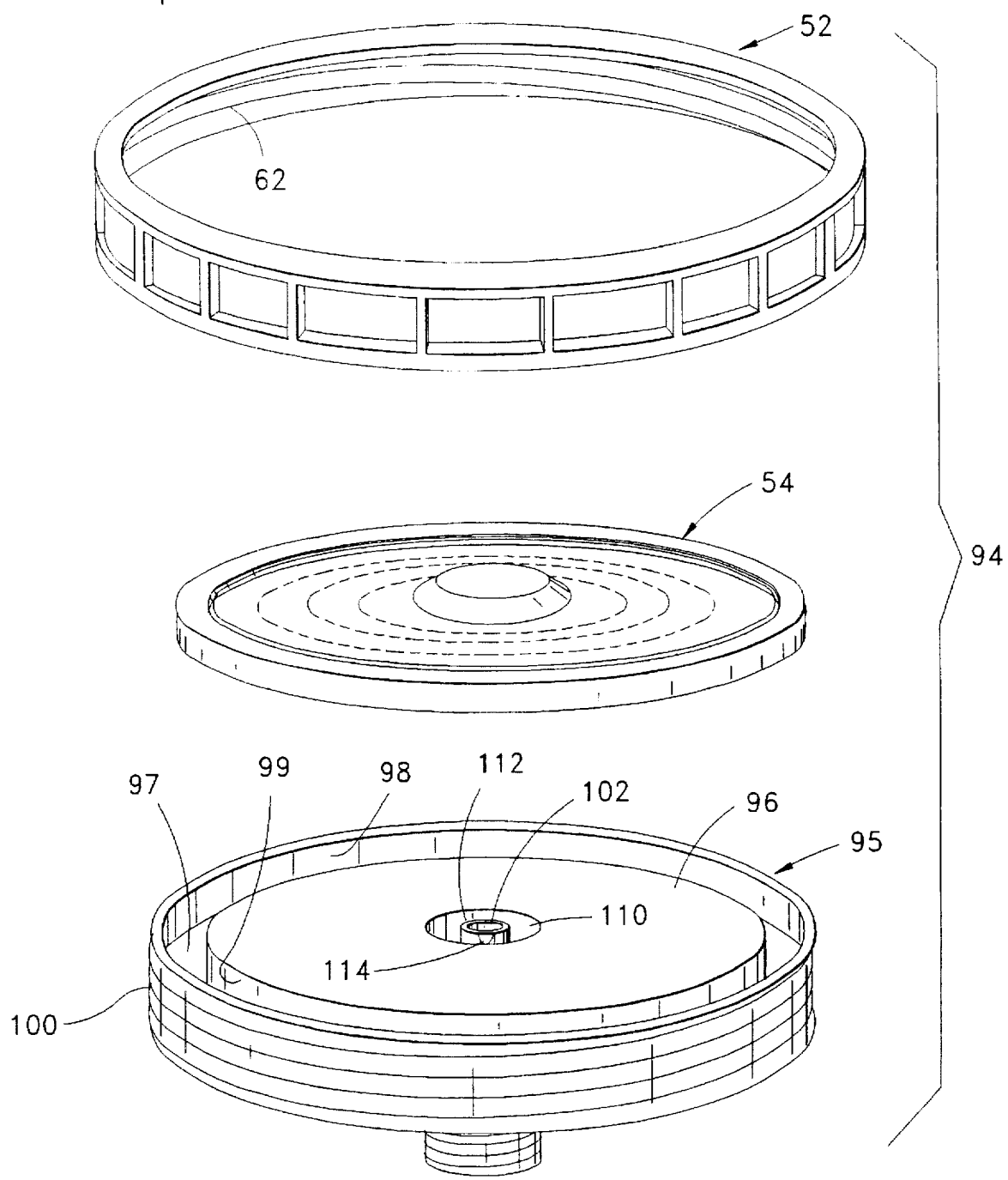

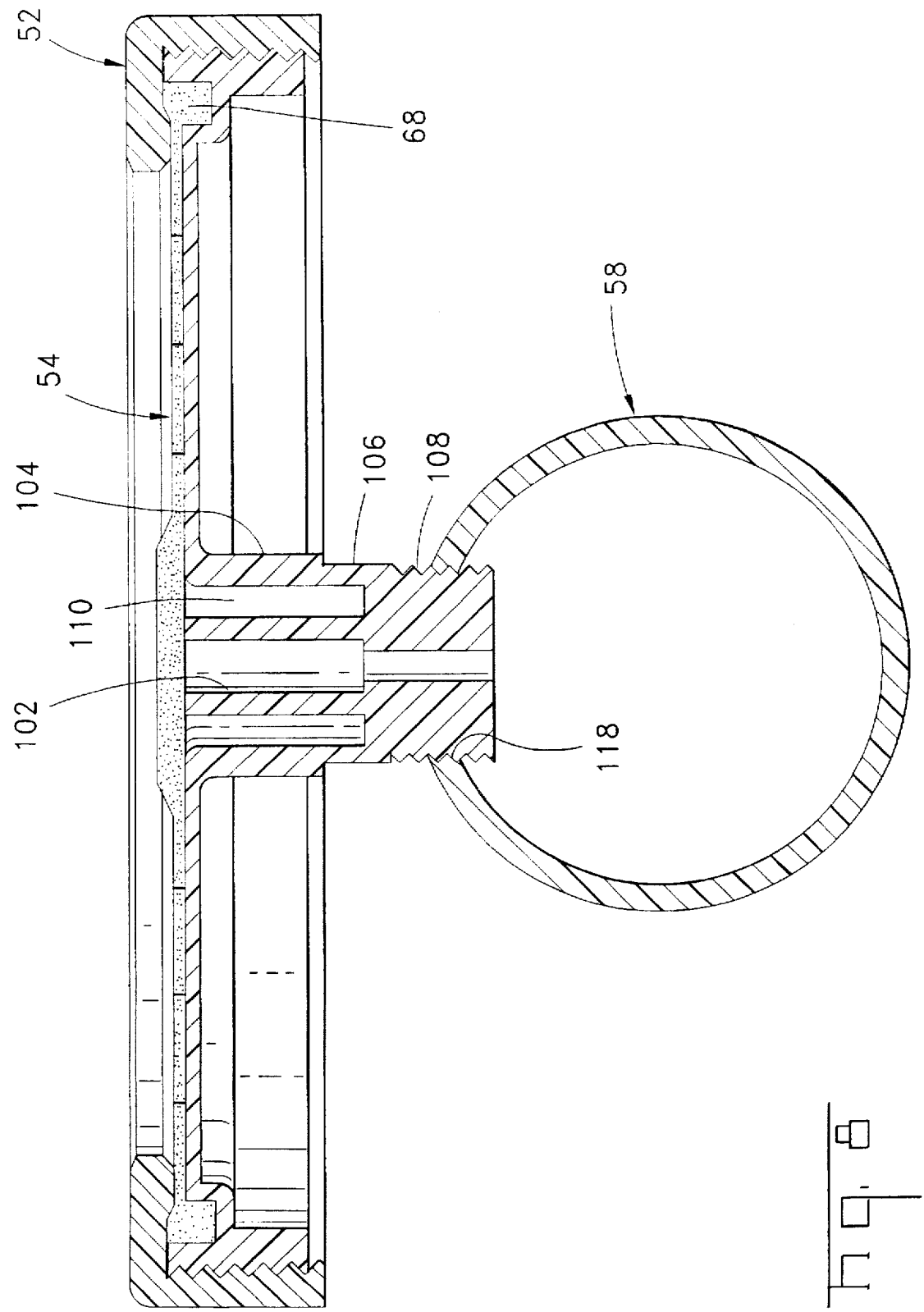

HEAT EXCHANGER FOR AERATION TANK

BACKGROUND OF THE INVENTION

This invention is directed to an improved wastewater treatment aeration tank, which includes a unique air distribution system to reduce the air temperature delivered to an array of air diffusers within the tank, where such diffusers are a vulnerable component of the aeration tank.

A typical aeration tank, illustrated in FIG. 1, is shown disposed between a primary treatment tank and a secondary clarifier. By way of background, for the primary treatment, preliminary sedimentation is the first process where removal of substantial quantities of suspended solids and materials causing biochemical oxygen demand in wastewater flow occurs. They are relatively quiescence in operation so as to permit suspended solids to settle if the specific gravity is greater than that of water, or float if the specific gravity is less. With the removal of the heavier sludge and the lighter skimmings being facilitated by the above noted separation, the remaining clarifier liquor may be transferred to the aeration tank.

FIG. 1 illustrates schematically the treatment of activated sludge in an aeration tank. This is an aerobic suspended-growth process in which biodegradable organics in wastewater are intimately mixed with a concentrated mass of biota and oxygen within an aeration tank. New microorganisms grow and flocculate as the biotic mass adsorbs, oxidizes, and reduces the organic wastes. As the mixed liquor leaves the aeration tank following several hours of aeration, the biotic mass with the newly formed floc is separated within one or more final settling tanks. A portion of the settled floc, the activated sludge, is returned to the aeration tank to maintain the required concentrations of biota, while excess sludge is removed for solids handling and ultimate disposal. Air, required for utilization of dissolved oxygen in metabolism and respiration, is a critical element to the process to maintain and prevent sedimentation in the aeration tank.

A commercial system that is currently in operation is one that uses a flexible membrane diffuser assembly, where an array of diffusers are disposed along the bottom of an aeration tank to transmit air under pressure from an air blower into the liquid medium—see U.S. Pat. No. 5,330,688, granted Jul. 19, 1994, to the inventor hereof, where the contents of said patent are incorporated herein in their entirety. It was discovered that the use of such flexible membrane diffuser assemblies, including a flexible membrane, typically formed of a polymer, known commercially as EPDM, are subject to a premature hardening at elevated temperatures. This has been particularly demonstrated at temperatures of 140 degrees F., and higher. Evidence has shown that some wastewater plants operating in warm climates using EPDM membrane diffusers, for example, have had premature membrane failures in as few as six months. This failure mode indicates that the membranes shrink and become hard. It is believed that the hardening of the membrane is generally a result of the contact between the membrane and the high process air temperatures, causing the membrane to polymerize. In warm climates, for example, the blower discharge temperature may be as high as 250 degrees F. The elevated temperature is the result of high ambient air temperature and the heat of compression in the air blower (approximately 15 degrees per psig of compression). It was thus critical find a means to lower the incoming air temperature to ensure sufficient diffuser life.

Cooling systems, to reduce the temperature of a transmitted medium, have been known for years, as exemplified by U.S. Pat. No. 2,071,509, to Dudley. The patent is directed to a regenerative cooling system comprising a helically wound coil as a heat exchanger, including means for effecting a continuous recirculation of a cooling liquid through the coil. In such a system, incoming air and recirculated air is passed over and around the coil, and cooled thereby.

U.S. Pat. No. 4,486,310, to Thornton, directed to the field of wastewater treatment facilities, relates to the operation of a wastewater trickling filter treatment system housing a medium with a dome sealingly attached. Means are provided in the dome to recirculate air through the filtering medium to change the temperature of the filtering medium, particularly to raise same during cold or winter temperature operations. The problem, as defined therein, is that the biological life within the filtering medium is the active agent for the treatment of the wastewater, however, its efficiency is temperature dependent. Thus, a means had to be devised to raise the temperature of the medium during cold temperature periods.

While the patent to Thorton relates generally to the area of waste-water treatment, and to the temperature control of the operation, it fails to address or even recognize the problem of deteriorating flexible polymeric membrane, diffuser assemblies. And, the latter is just one of the types of diffused aeration units in use today, including a membrane cap diffuser (coarse bubble membrane), a diffuser tube (medium and fine bubbles), and a porous membrane (fine bubbles). The present invention relates to polymer type membranes of all types. Aeration systems relying on the fine bubbles of a flexible porous membrane diffuser have distinct advantages. However, these advantages can be lost with the premature failure of the membrane and the time lost in frequent maintenance. The manner by which the problems herein noted are overcome will become apparent in the specification which follows, particularly when read in conjunction with the accompanying drawings.

SUMMARY OF THE INVENTION

The invention relates to the combination of an aeration system for a wastewater or water treatment facility consisting of a treatment tank of predetermined depth, a plurality of air diffusers disposed along the bottom of the tank, an air blower, and an air distribution piping system to deliver air under pressure from the air blower to the air diff-users, and a tube bank heat exchanger located in the wastewater within the tank. The tube bank heat exchanger, arranged in line with the air distribution piping system within the tank, comprises a piping system, through which air from said air blower passes, of an equivalent length that exceeds three times the predetermined depth of the treatment tank. A preferred tube bank heat exchanger system comprises a multi-tube manifold type system, and an air diffuser including an essentially planar flexible, porous diffuser membrane secured to a diffuser housing by a threadably engaging retaining ring.

BRIEF DESCRIPTION OF THE DRAWINGS

FIG. 7 is an exploded, perspective view of a second embodiment of another preferred diffuser assembly, where said assembly is centered along and mounted in the wall of a submerged header pipe.

FIG. 8 is an enlarged sectional view of the assembled diffuser assembly of FIG. 7.

DETAILED DESCRIPTION OF PREFERRED EMBODIMENTS

Figure 1:
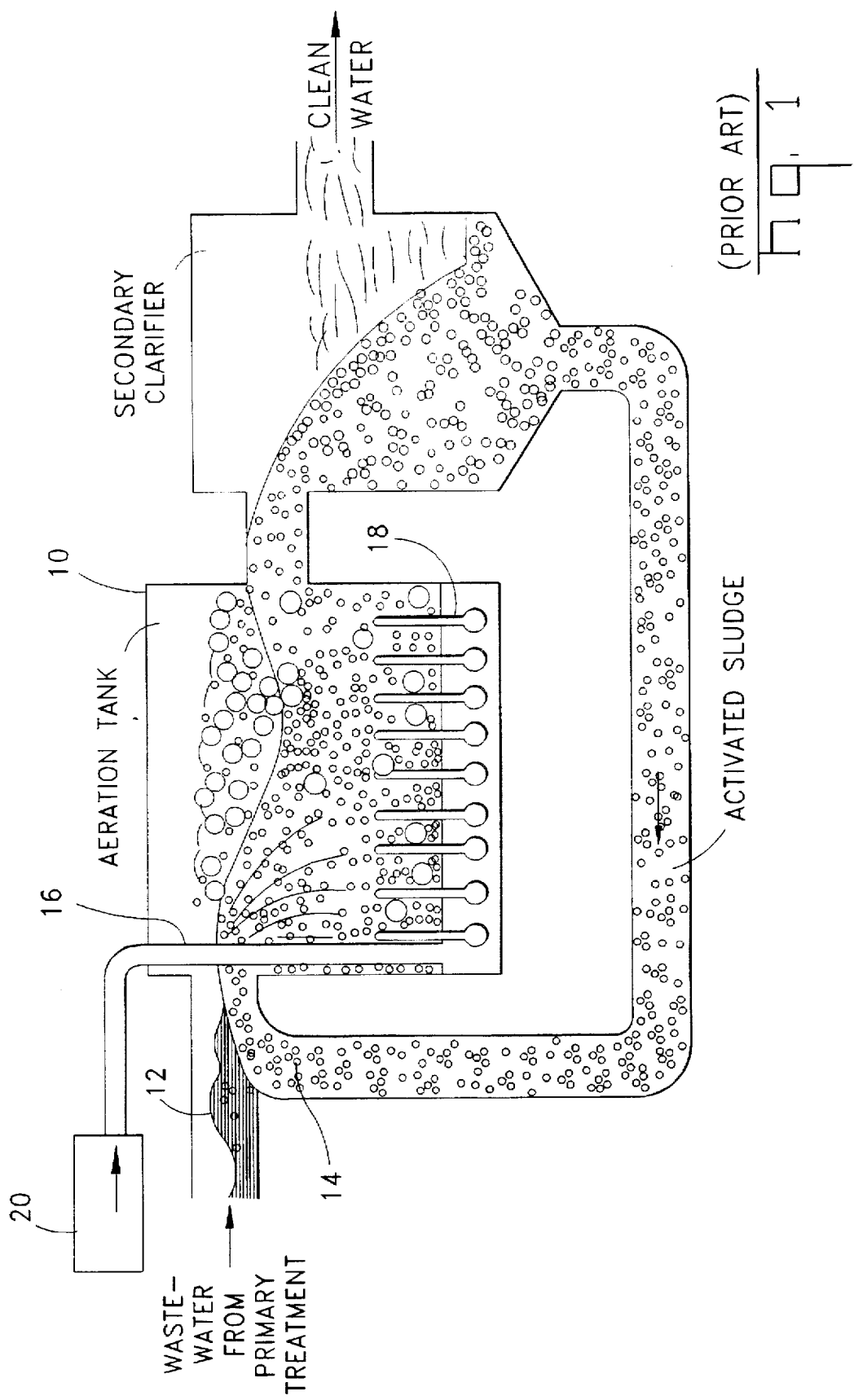
FIG. 1 is a schematic diagram of prior art for an activated sludge treatment system, including an aeration tank disposed between a primary treatment tank and a secondary clarifier.

The invention relates to an improved wastewater treatment system, particularly in the design and operation of an aeration tank, where an array of air diffuser assemblies, having a polymeric type porous membrane, may be exposed to temperatures which can have a deleterious effect on the performance of such porous membranes.

A typical liquid wastewater treatment system, as known in the art, may comprise (a) pretreatment to neutralize, alter, or remove nonbiologically degradable, toxic, hazardous, and highly corrosive materials, (b) primary treatment to achieve primary sedimentation or clarification of substantial quantities of suspended solids and materials causing biochemical oxygen demand in wastewater flow, and (c) secondary or biological treatment. This may include an aeration tank and secondary clarifier, by the use of biological organisms, predominantly aerobic bacteria, to convert and metabolize dissolved and colloidal matter remaining in wastewater to new cellular material, carbon dioxide, and water.

It is rather obvious from the above that proper and efficient waste-water treatment requires the efficient operation of a number of treatment facilities. Many such facilities use mechanical devices which can be readily removed for maintenance or repair, without significant loss in down-time. However, the aeration tank, where the design and operation thereof is the thrust of this invention, with its array of diffuser assemblies disposed along the bottom of the tank, is not a system that lends itself to easy maintenance. If repairs or maintenance are required, the entire system or wastewater flow must be stopped and the aeration tank emptied to expose the diffuser assemblies for repair or maintenance.

The use of porous membrane diffuser assemblies has now become popular due to their low cost and efficiency. However, porous, flexible membranes, when manufactured from polymeric materials, such as EPDM, for use in such assemblies, may exhibit a limited life when exposed to temperatures above its polymerization temperature, typically about 140 degrees F. That is, the EPDM type flexible membranes begin to heat age which causes hardening, and subsequent failure. This is particularly true in warm climates, or where aeration tanks are exceptionally deep, as will be explained hereinafter.

It was discovered that the useful life of the diffuser membrane is critical to the further success of the flexible, porous membrane type diffuser in the wastewater treatment industry. Thus, one way to increase the life of the diffuser membrane is to reduce the temperature of the process air, see FIG. 1, coming in contact with the membranes. In doing so, the amount of premature hardening taking place in the membrane material will be reduced, thereby preventing the shrinking and hardening of the membrane, known as heat aging. Through experimentation, it was found that maintaining a maximum air temperature of 140 degrees F. at the membranes will sufficiently prevent the degradation of the membranes due to temperature. This experimentation led to the development of a unique heat exchanger tube bank, to effect the desired temperature reduction, as more clearly described in the accompanying drawings.

Turning now to the several Figures, FIG. 1 illustrates schematically the operation of the aeration tank 10 within the broader wastewater treatment operation. Wastewater 12, from the primary treatment, along with recirculated activated sludge 14, enters the aeration tank 10 where the biodegradable organics in the wastewater are mixed with a concentrated mass of biota and oxygen, where the oxygen comes from air under pressure through a standard drop pipe 16 and diffuser assemblies 18. Typically, compressed air, such as by means of an air blower 20, is delivered by the straight or standard drop pipe 16 to introduce and maintain dissolved oxygen and mixing. In warm climates, for example, the air blower temperature may be as high as 250 degrees F. The elevated temperature is the result of high ambient air temperature and the heat of compression in the air blower 20 (approximately 12 to 15 degrees F. per psig of compression). Significant positive pressure is required to force the air through the diffuser assemblies 22 (FIG. 2), which are typically submerged beneath about 18 feet of wastewater to be treated. The greater the depth, the greater the pressure required for operation of the system.

Figure 2:
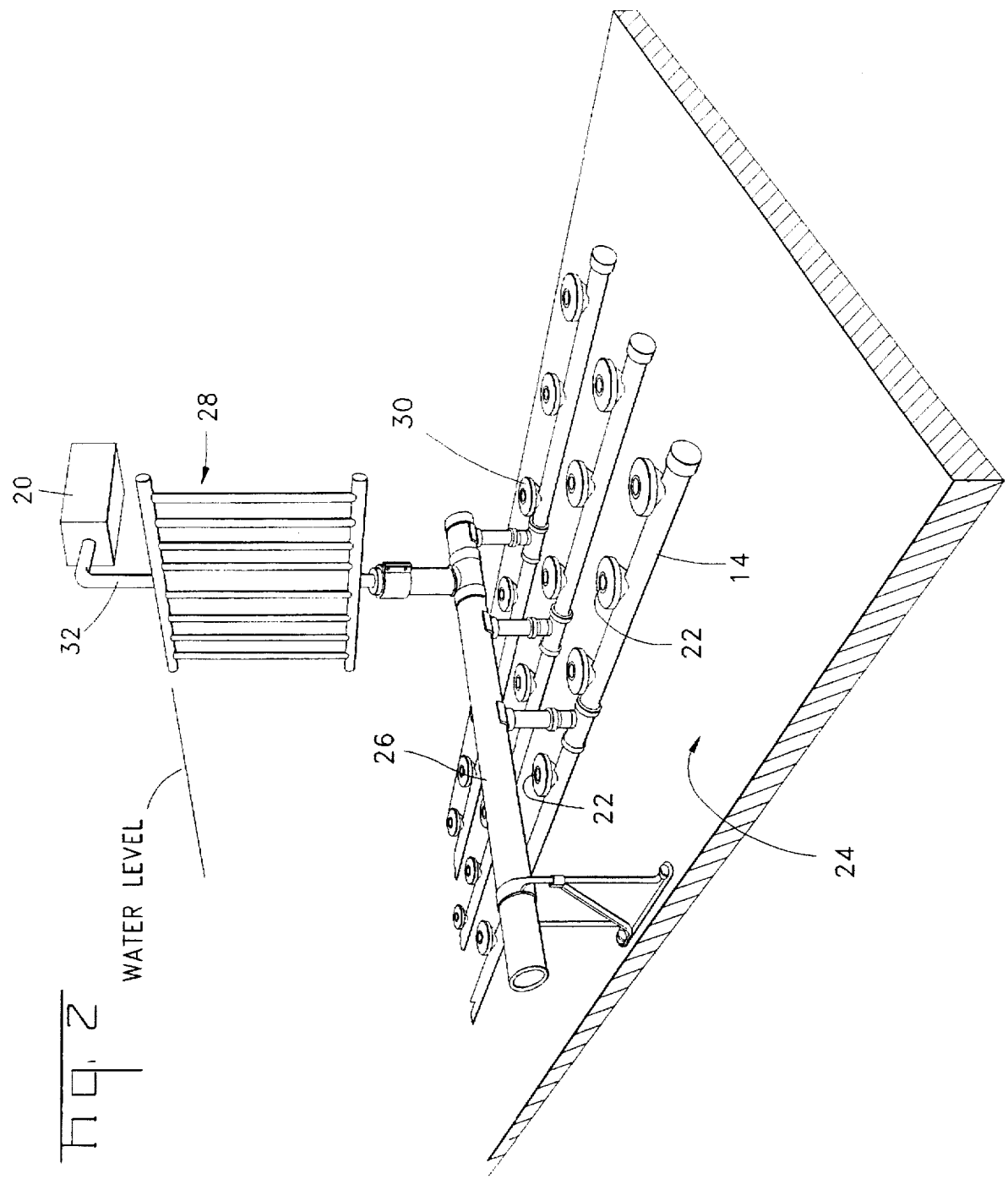
FIG. 2 is a perspective view of an improved aeration piping system for the aeration tank, having incorporated therein a tube bank heat exchanger according to the present invention, where portions of the tank walls have been removed to illustrate details within the tank.

FIG. 2 illustrates more clearly the contributions of this invention. There are shown the major components of the improved aeration system, including the tank 24, into which the wastewater is received for treatment, a piping system including a manifold 26 for delivering air to the array of flexible diffuser assemblies, and a tube bank heat exchanger 28. The tube bank heat exchanger is submerged within the wastewater being treated, and positioned to receive air under pressure from the air blower 20 for distribution of such air to the manifold 26, thence to the porous membranes 30 of the diffuser assemblies to be released therethrough as fine bubbles. One advantage of the tube bank heat exchanger 28, to be described shortly, is the ease with which it may be retrofitted to existing systems. Specifically, the heat exchanger may be positioned in-line with the single drop pipe 32 between the air blower 20 and manifold 26.

Figure 3:
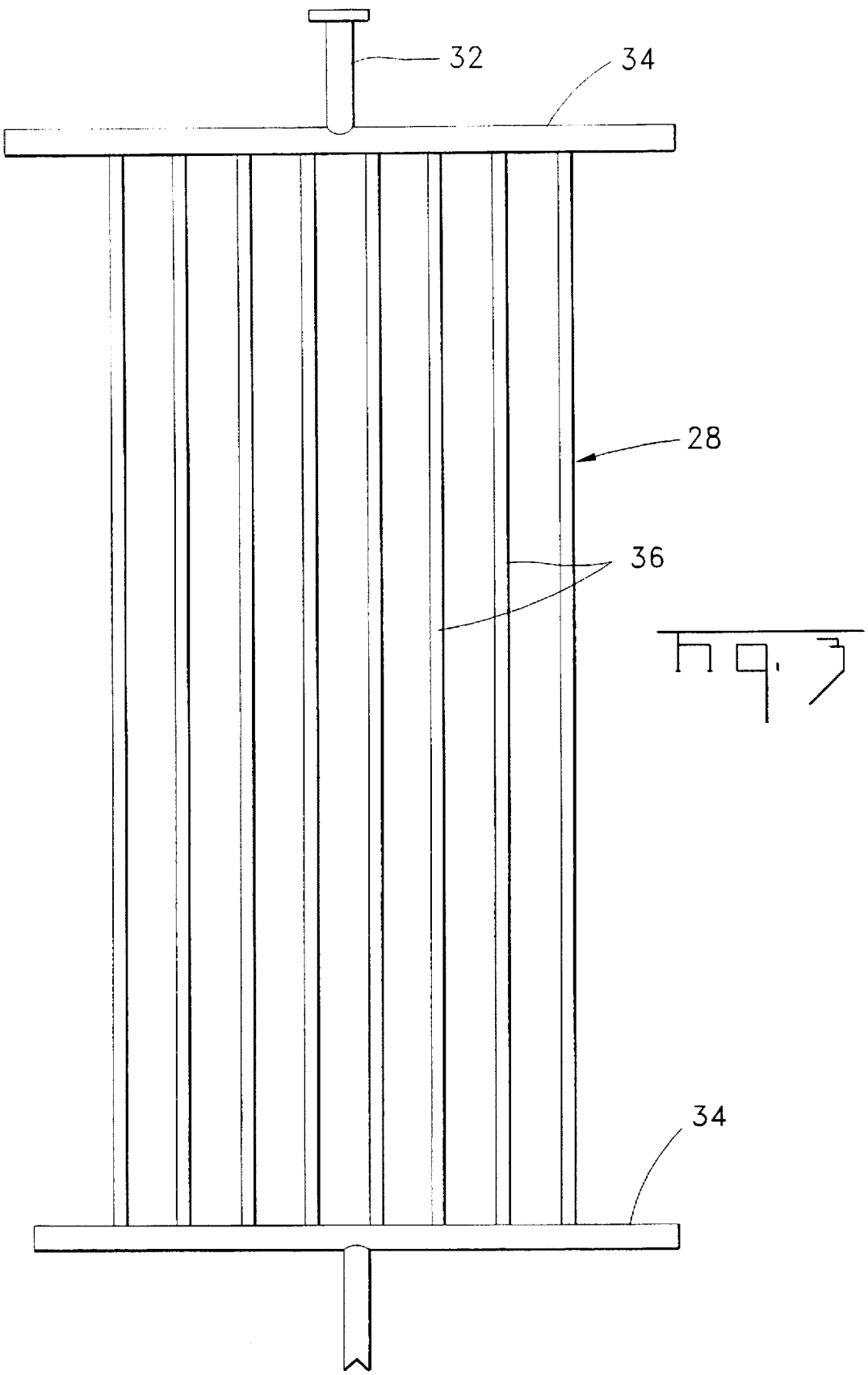
FIG. 3 is a plan view of the tube bank heat exchanger of FIG. 2, where this manifold type heat exchanger represents a preferred embodiment thereof.

The preferred tube bank heat exchanger 28 is best illustrated in FIG. 3. When submerged within he wastewater, the heat exchanger acts as an air-to-water heat exchanger by breaking the single drop pipes 32 down into several smaller drop pipes. The preferred heat exchanger 28 comprises a pair of horizontally disposed closed-ended pipes or chambers 34 and a plurality of smaller pipes or conduits 36 extending therebetween. As a preferred embodiment, with a drop pipe having an I.D. of six inches, the pair of horizontal pipes will have an I.D. of six inches, spaced about 18 feet apart, and the plural vertical pipes, preferably eight in number, will have an I.D. of two inches, all of which are formed of a heat conductive metal, such as stainless steel. By this design arrangement, there is an increased surface contact area between the heat conducting pipes and the wastewater, and an increased contact time by reducing the air velocity in the smaller plural vertical pipes 36. With this design, it was possible to reduce the temperature of the air being delivered to the diffuser assemblies 18 to a maximum of 140 degrees F. The aeration of the wastewater, for example, causes the wastewater to flow around the tube bank heat exchanger, extracting or removing heat therefrom, to provide improved heat dissipation or heat exchanging. To supplement the cooling of the air being delivered to the diffuser assemblies 18, evaporative cooling may be used. Specifically, a 90 degree angled evaporative cooling pipe may be placed in the drop pipe 32, with the opening directed down stream, where a cooling mist is injected therethrough to further cool the incoming air.

Figure 4:
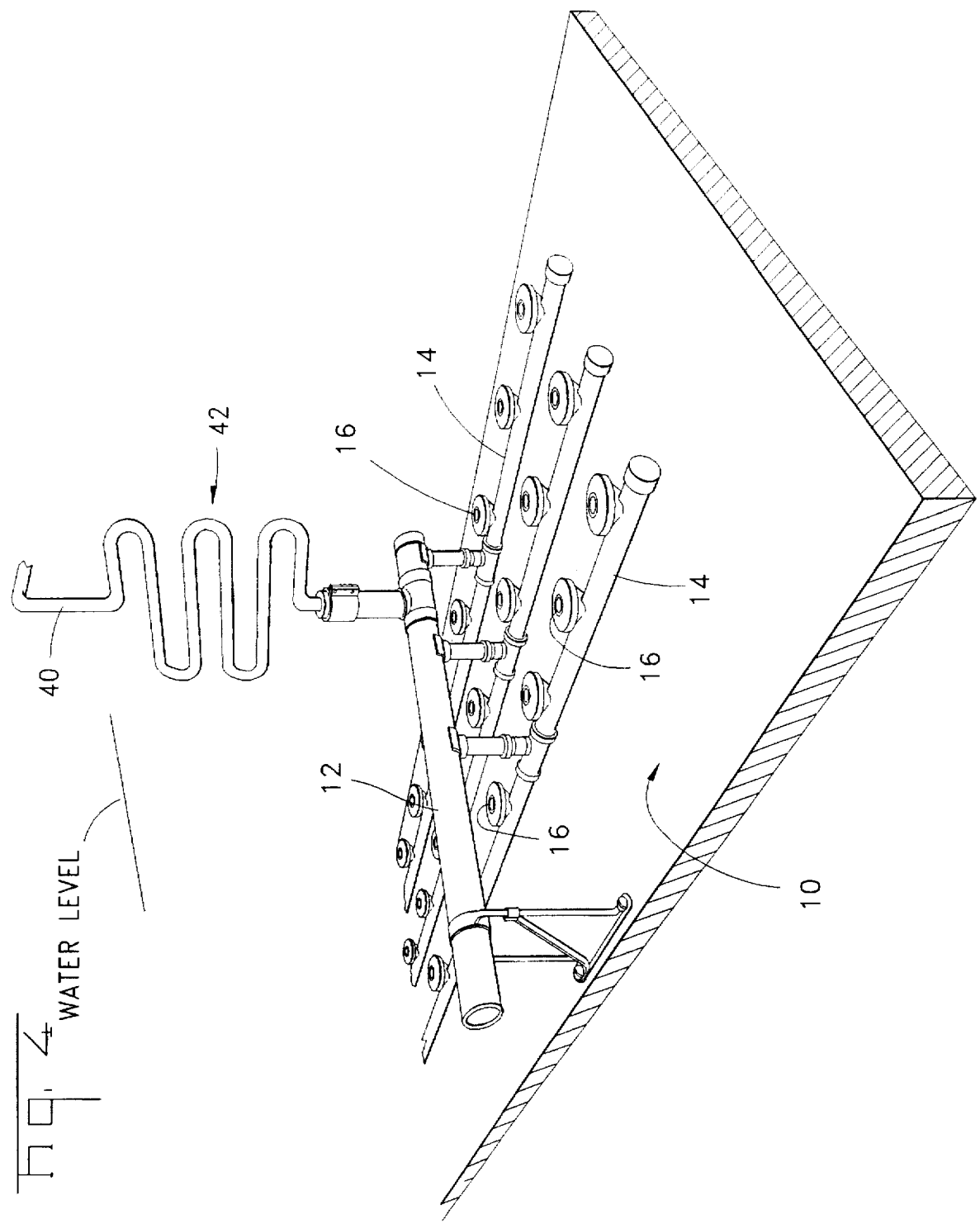
FIG. 4 is a perspective view similar to FIG. 2 showing a second embodiment for the tube bank heat exchanger of this invention.

FIG. 4 represents an alternate embodiment to the heat exchanger of FIG. 3. In the embodiment, the drop pipe 40 has been changed from a vertically arranged single piece to a single pipe that is formed in a snake-like fashion 42, or a sinusoidal configuration, where the length of the curved pipe is at least three times the depth of the wastewater. By this simple arrangement, the contact time between the heat conducting pipe surface and the wastewater has been significantly increased to the point that the temperature of the air passing through the pipe section 42 is reduced.

Since the introduction of the flexible diffuser assembly, as exemplified by U.S. Pat. Nos. 3,997,634 and 5,330,688, to the inventor hereof, improvements have been made to the construction and design of the diffuser assembly. FIGS. 5 to 8 represent two preferred embodiments for a diffuser assembly, where such new diffuser assemblies are distinguished by a retaining ring which overrides the porous membrane for threading engagement to a base member.

Figure 5:
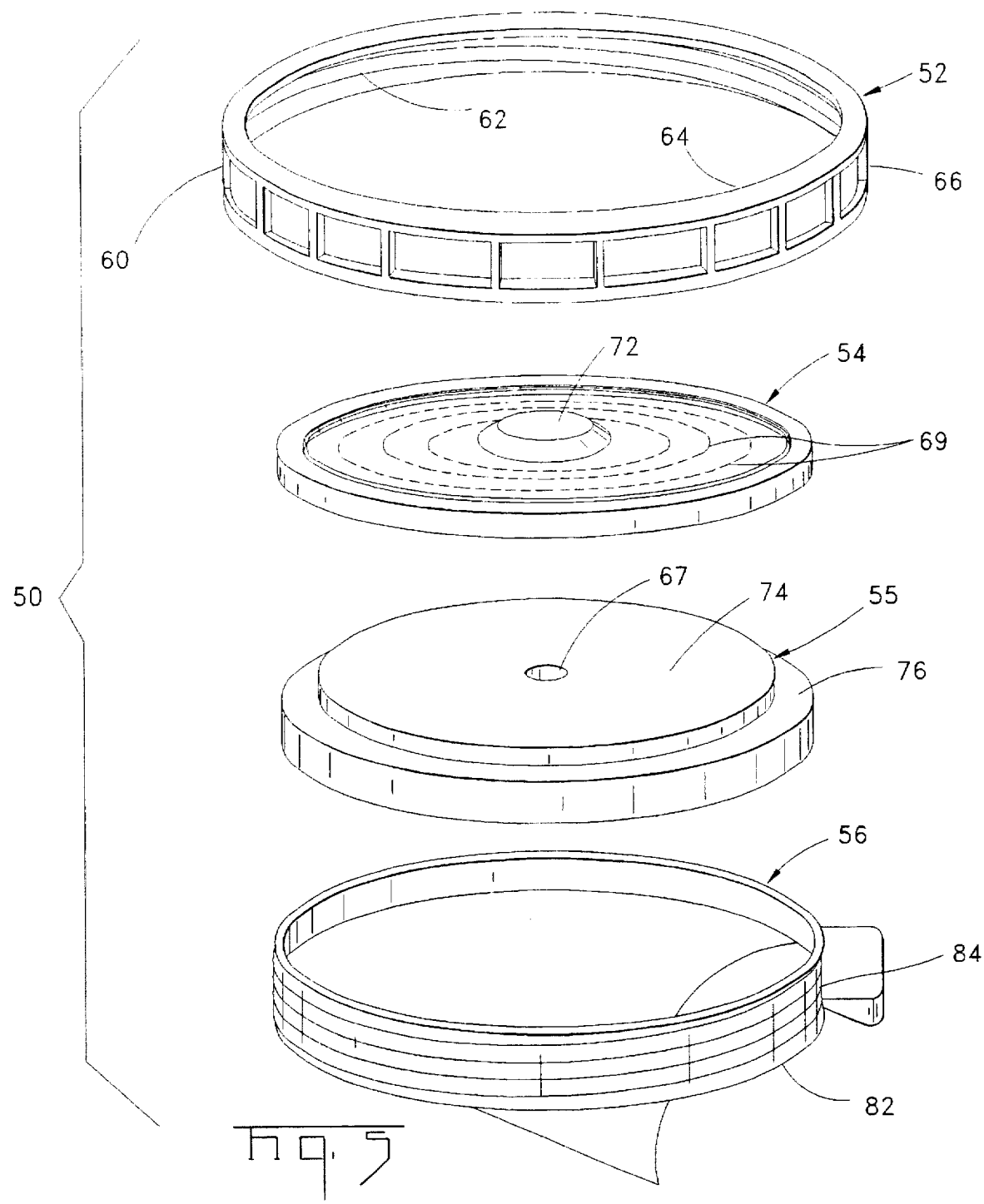
FIG. 5 is an exploded, perspective view of a first embodiment of a preferred diffuser assembly, where said assembly is illustrated as being offset from a submerged header pipe.
Figure 6:
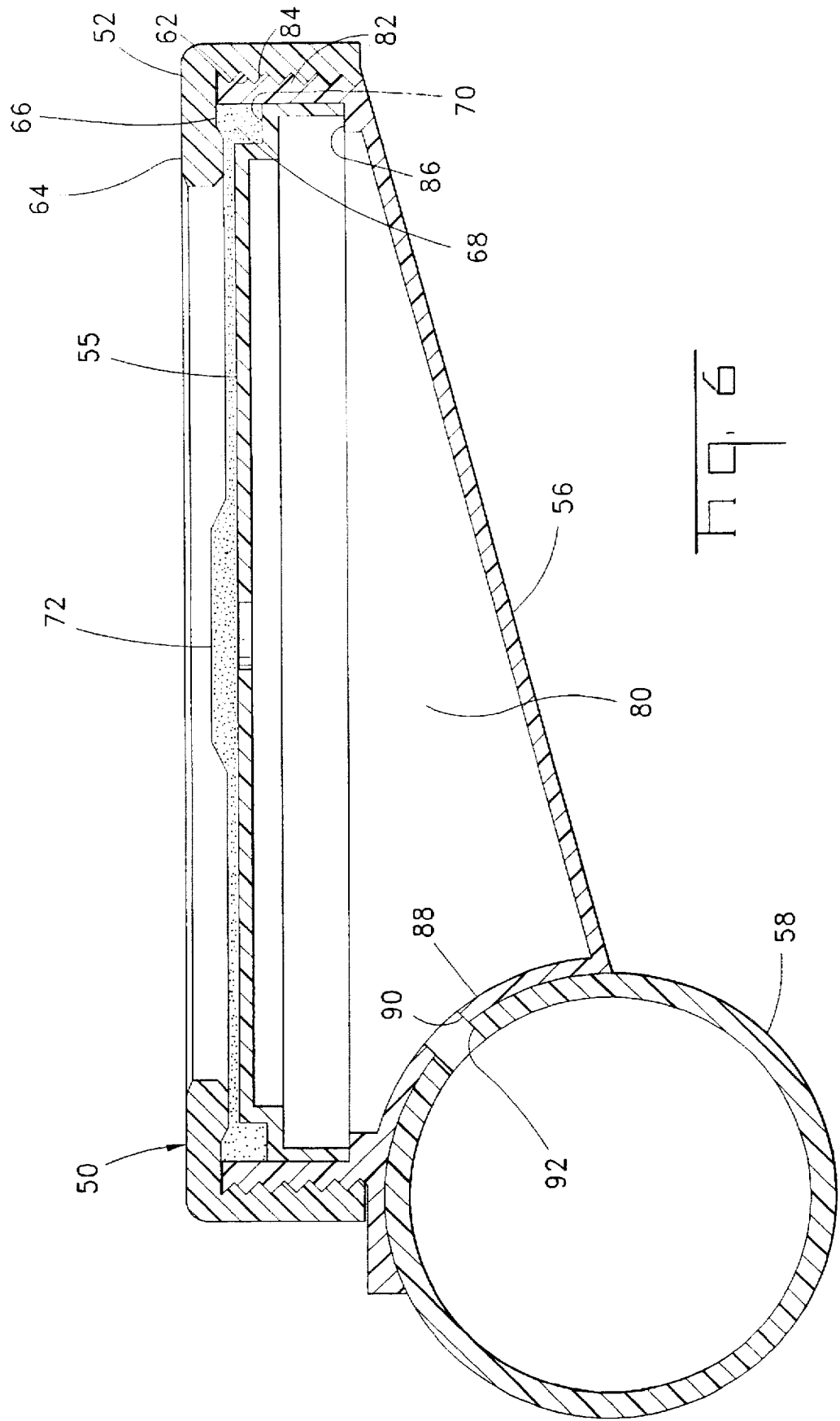
FIG. 6 is an enlarged sectional view of the assembled diffuser assembly of FIG. 5.

FIGS. 5 and 6 illustrate a first preferred embodiment for a diffuser assembly 50, which incorporates the retaining ring 52 and porous membrane 54. In addition, for this embodiment, there are incorporated a membrane support plate 55, and a base 56, where the latter is secured to and in communication with a header pipe 58, as hereinafter described. The retaining ring 52, preferably formed of PVC, as known in the art, comprises an annular wall 60, internally threaded 62 for engagement with external complementary threads on said base. Additionally, the retaining ring 52 is provided with an inwardly directed shoulder 64, along the top edge 66 of annular wall 60. As best seen in FIG. 6, the shoulder 64 overrides and retains the porous membrane 54 in position.

The porous membrane 54 is distinguishable from the inventor's prior art membranes, in that it is essentially planar in design. Rather than incorporate a wrap around edge, as with earlier designs, the periphery of the membrane 54 is characterized by an upstanding annular rib 66 and a slightly larger downwardly projecting rib 68 having an annular groove 70 therein. The latter rib 68, when the membrane is positioned over the support plate 55, fits snugly onto a shoulder, as later described. The upstanding rib 66 provides some structural stability to the assembly and bears against the retaining ring 52. Further, as with the earlier membrane designs, a thicker, upraised center portion 72 is provided to give additional structural stability, particularly over the opening 67 or air passageway. Finally, the membrane includes a plurality of slots 69, arranged in a series of concentric circles, to allow air to pass therethrough.

Supporting and underlying the membrane 54 is the support plate 55. Such plate comprises a slightly domed support member 74 having an L-shaped peripheral shoulder 76 to snugly receive a complementary annular rib 68 on the membrane 54, as noted above. Centrally positioned along the domed support member 74 is an opening 69, which, as noted hereafter, allows air under pressure to pass from the base 56 to beneath the porous membrane and exit through the slots 69 as fine bubbles of air.

The base 56 is designed to be secured to the top-to-side quadrant of a header pipe 58. Such design is particularly suited where the header pipe may be in close proximity to the tank wall, where positioned, and space is at a premium. In any case, the base 56 includes a chamber 80, a peripheral side wall 82, having external threads 84 thereabout for engagement with the complementary threads 62. Internally, the chamber 80 is provided with an annular shoulder 86 upon which the support plate 55 is seated. Externally, the chamber includes a curved wall 88, where the shape of such curved wall is comparable to the shape of the header pipe 58, so as to be secured snugly thereagainst. Such wall 88 also includes an opening 90 aligned with a comparable opening 92 in the wall of header pipe 58.

The alternate preferred embodiment illustrated in FIGS. 7 and 8 is of the type for centrally positioning the diffuser assembly 94 along a header pipe 58. Such assembly 94 incorporates a similar retaining ring 52 and porous membrane 54. The base 95 is different and consists of a single piece, which is preferably formed or molded from polypropylene. The base comprises an upper support member 96, for supporting the porous membrane 54, where the periphery thereof includes a groove 97 defined by a peripheral wall 98 and shoulder 99 for snugly receiving the downwardly projecting rib 68 of the membrane 54. Externally the peripheral wall 98 is threaded 100 to engage the complementary internal threads 62 of the retaining ring 52.

Centrally of the upper support member 96 there is provided a through hole 102 within concentric, downwardly extending projections 104, 106, 108. The uppermost projection 104 defines a larger cavity 110 with a circular extension 112 through which hole 102 passes. The extension 112 may include one or more notches 114. The intermediate projection 106 may be multi-sided, such as hexagonal, to accommodate a tool for securely engaging the retaining ring 52 and the base 95. Finally, the lowermost projection 108 is threaded 116 to engage a complementary hole 117 in the header pipe 58.

I claim:

1. In combination with an aeration system for a wastewater treatment facility consisting of a treatment tank containing a quantity of wastewater having a predetermined depth, a plurality of air diffusers disposed along the bottom of said tank, an air blower and air distribution piping system to deliver air under pressure from said air blower to said air diffusers, the improvement comprising, a tube bank heat exchanger in line with said distribution piping system and located within said wastewater, said tube bank heat exchanger comprising a piping system, trough which air from said air blower passes, of a length that exceeds three times said predetermined depth.

2. The improved combination according to claim 1, wherein said tube bank heat exchanger comprises a single pipe extending between said air blower and said air diffusers, where at least a portion of said single piping is arranged in a sinusoidal configuration.

3. The improved combination according to claim 1, wherein said air distribution system includes an evaporative cooling device, located down stream from said source of air under pressure, to inject a cooling mist of water into the air leading to said tube bank heat exchanger, whereby said tube bank exchanger and evaporative cooling device combine to reduce the temperature of air delivered to said air diffusers.

4. The improved combination according to claim 1, wherein said tube bank heat exchanger comprises a first single pipe in communication with said air blower, a second single pipe in communication with said air diffusers, and a multi-pipe manifold system communicating with said first and second pipes.

5. The improved combination according to claim 4, wherein said multi-pipe manifold system comprises first and second manifolds and a plurality of conduits extending therebetween.

6. The improved combination according to claim 5, wherein there are eight said conduits.

7. The improved combination according to claim 1, wherein each said air diffuser includes an essentially planar flexible, porous diffuser membrane, a housing, and a threadably engaging retaining ring secured to said housing.

8. The improved combination according to claim 7, wherein each said air diffuser assembly further includes a domed plate to support said flexible, porous diffuser membrane, and that said plate includes a central opening communicating with said housing to deliver said air under pressure to said flexible, porous diffuser membrane.

9. The improved combination according to claim 8, wherein said flexible, porous diff-user membrane includes a downwardly projecting peripheral rib for engaging a complementary shoulder about said plate.

10. The improved combination according to claim 9, wherein said retaining ring includes a continuous flanged portion to override and retain said peripheral rib of said flexible, porous diffuser membrane in intimate contact with said shoulder.

11. A tube bank heat exchanger for use in reducing the temperature of air delivered under pressure to an air diffuser system having plural diffuser assemblies, including porous membranes, disposed in a wastewater treatment facility and submerged a predetermined depth within a tank of wastewater, where the temperature of said air thus delivered is based upon ambient temperature and the heat of compression of the air under pressure, and said combination may cause failure of said membranes, characterized in that said tube bank heat exchanger extends between and in communication with the source of said air under pressure and said air diffuser system, said tube bank heat exchanger being submerged within said wastewater and of a configuration which extends the air flow path between said source and said air diffuser system to a sufficient degree to reduce said combination temperature to no more than 140 degrees F.

12. The tube bank heat exchanger according to claim 7, wherein said air pressure is between 7 and 12 psi.

13. The tube bank heat exchanger according to claim 11, wherein said configuration is designed to extend the air flow path to at least three times said predetermined depth.

14. The tube bank heat exchanger according to claim 13, wherein said configuration is designed to extend the air flow path to at least six times said predetermined depth.

15. The tube bank heat exchanger according to claim 11, wherein said diffuser system includes an evaporative cooling device down stream from said source of air under pressure to inject a cooling mist of water into the air leading to said tube bank heat exchanger to supplement the reduction of said combination temperature.

* * * * *